Figure 1:
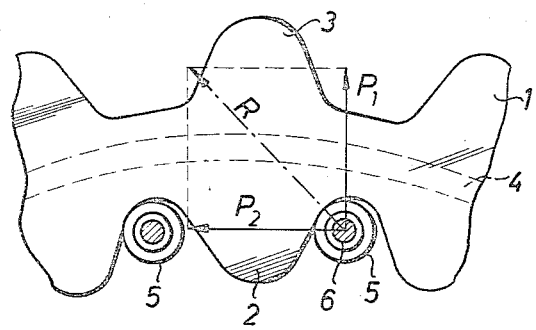

INVENTOR
HANS-HOLGER WIESE
ATTORNEYS

United States Patent Office 3,313,167
Patented Apr. 11, 1967

3,313,167
TOOTHED BELT DRIVE
Hans-Holger Wiese, Fuhrberg, Germany
Filed Mar. 16, 1965, Ser. No. 440,201
Claims priority application Germany, Mar. 17, 1964,
W 36,403
10 Claims. (Cl. 74—229)

The invention relates to a toothed belt drive and particularly to a toothed belt consisting of a yieldable and elastic material such as rubber, plastic or the like and having elastic teeth. This belt is running over pulleys which comprise a pair of discs or rings connected by a series of equidistant pins the axes of which are parallel with the axis of the pulley. These pulleys resemble lantern wheels used in toothed gearings. The pins of said pin-wheel gear carry rotatable sleeves which engage with the tooth spaces of the belt.

It is known in the art to provide toothed belts with an imbedded reinforcement of wire cables or steel wires of great tensile strength. Such toothed belts may be employed either as driving belts, as lateral borders of belt-conveyors carrying a plurality of transverse rods, as traction means of bucket conveyors, as cooling belts or the like, whereby the belt is driven or guided by means of pulleys provided with a pin-wheel gear. The toothed belt is subjected to tensile stress and in moving about the driving pulleys its yieldable teeth are subjected to a certain deformation mainly occurring on the tooth faces. That part of the tooth faces adjacent to the sleeves of the pin-wheel gear is subjected to both a strong stress and wear arising from the resultant of radial force as well as from the force acting in circumferential direction of the driving pulley. Besides, in respect of the conventional shape of the teeth the depth of which amounts to several times the length of the sleeve diameter, and due to the elasticity of the belt material the bearing surface on the bottom of the tooth spaces can no longer be effective but may cause a considerable difference of the pitch between the toothed belt and the pin-wheel gear of the pulley. In addition, there will be a strong pressure between the sleeves and the reinforcement of the belt, further increasing the wear of the tooth faces.

It is a main object of the invention to protect the elastic teeth of the toothed belt against wear when engaging into the pin-wheel gear of the pulley and to increase the durability of the toothed belt.

Another object of the invention is to provide a pulley structure of the above-mentioned type which may be manufactured much cheaper than the conventional pulleys with pin-wheel gears.

According to the invention the teeth of the belt are provided with a support between the sleeves of the pins of the lantern wheels of the pulleys. Such support will take up the radial force arising between the sleeves whereby both the tooth faces and the sleeves will be charged merely with the comparatively small peripheral force resulting during the transmission of driving energy.

A further object of the invention is to choose a tooth depth less than the diameter of the sleeves of the pin-wheel gear of the pulley. Such shortening prevents a heavy deformation of the teeth as well as the occurrence of larger differences in the pitch of the belt. Furthermore, the bearing surface of the sleeves of the pin-wheel gear will be brought nearer to the reinforcing wires or cables imbedded in the belt by such shortening of the teeth, whereby especially favorable conditions for the transmission of force between the pin-wheel gear of the pulley and the teeth of the toothed belt will be brought about.

Still another object of the invention is to provide the tooth spaces in peripheral direction of larger width than the diameter of the sleeves of the pin-wheel gear. Thereby it is ensured that in a driving pulley those tooth faces of the belt only will come into close fit with such sleeves of the pin-wheel gear which effect the transmission of force whilst the tooth faces not charged do not engage the sleeves. The sleeves suitably embrace a free interspace between themselves and the base of the tooth of the belt.

According to a further feature of the invention for supporting the teeth on the periphery of the pulley, axially parallel bearing surfaces for the crest of a tooth are arranged in the spaces between the equidistant sleeves rotatably mounted upon the pins of the lantern wheel of the pulley. These bearing surfaces are preferably ridge-shaped and interchangeably inserted into recesses of the pulley. On their internal sides the bearing surfaces are preferably provided with peg-shaped studs pressed into radial bores of the pulley. Thus a particularly simple structure of the pulleys is made possible, as the bearing surfaces can easily be pressed into the corresponding bore-holes of the pulley of, e.g., U-shaped profile, and the pulley may be made of a pair of discs connected by a plurality of the pins upon which the sleeves are mounted.

The bearing surfaces may consist of metal or plastic. They are suitably made of a material having good running qualities, and self-lubricating properties, e.g., a graphitic plastic or the like, in order to ensure a reliable protection of the teeth crest against wear.

The crests of the teeth are suitably flattened so that the toothed belt snugly fits on the axially parallel bearing surfaces between the sleeves of the pin-wheel gear and can also run over smooth driving or deviating wheels.

Figure 2:
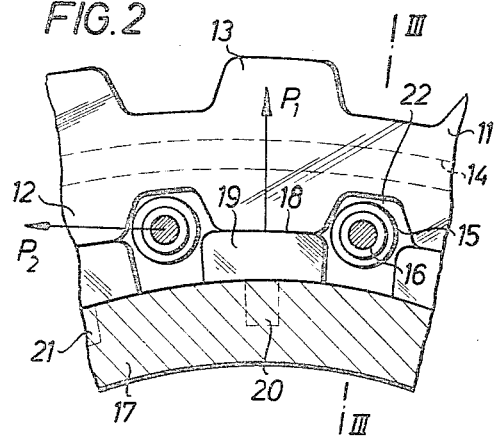
Figure 3:
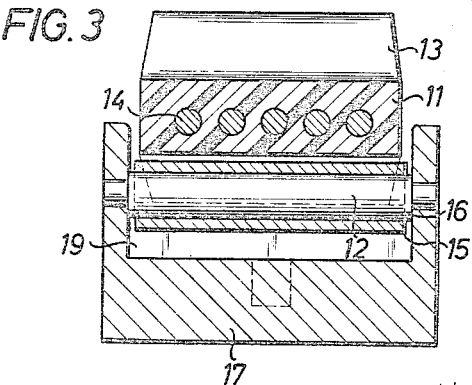

Further details and advantages of the invention will result from the following description given with reference to the accompanying drawings in which:

FIGURE 1 represents a partial side view of the conventional embodiment of a toothed belt drive with a diagram of forces, respectively, FIGURE 2 is the partial side view of an embodiment of the invention with a diagram of forces, respectively, FIGURE 3 is a partial cross-sectional view of the toothed belt drive taken on line III—III of FIG. 2.

The conventional embodiment of a toothed belt drive consists of a toothed belt 1 of elastic material, such as rubber, plastic on the basis of polyethylene, polyamide or the like. The belt 1 has internal teeth 2 and external teeth 3. The teeth 2, 3 consist of the same elastic material as the belt 1 which in its neutral zone is provided with an imbedded reinforcement 4 resistant to extension. Sleeves 5 are in engagement in the spaces between the teeth 2 which sleeves are rotatably mounted on pins 6 of a pin-wheel gear of the pulley. The pulley which is not shown in the drawing is mounted on a driving shaft and runs in clock-wise direction, whereby each of the front faces of the teeth 2 when in rotating direction comes into contact with the sleeves 5 which bear on the tooth base, too. The radial force $P_1$ and the peripheral force $P_2$ cooperate into a resultant R working on both the faces of the teeth 2 and the sleeves 5 of the pin-wheel gear. These members therefore are strongly charged, whereby considerable wear occurs on the surface of the teeth 2 adjacent to the sleeves 5.

In the embodiment of the invention illustrated in FIGURES 2 and 3 the internal side of the toothed belt 11 consisting of elastic material is tipped with teeth 12 and its external side carries teeth 13. The teeth 12, 13 consist of the same material as the belt 11. The internal teeth 12 serve for the transmission of force and the external teeth 13 suitably showing the same pitch as teeth 12, serve for receiving transverse rods, if, for example, the toothed belt is employed as grate-type conveyor belt.

In its neutral zone the toothed belt 11 is provided with an intermediate reinforcement 14 resistant to extension and consisting of a plurality of parallel steel wires imbedded in the material of the belt 11. Sleeves 15 are meshing into the spaces between the teeth 12, which sleeves are rotatably mounted on pins 16. The pins are designed to form a pin-wheel gear of a pulley 17 mounted on a driving shaft which is not illustrated in the drawing. The pulley 17 may also be rotatably mounted on its shaft, e.g., when serving as a guiding or deviating wheel for the toothed belt 11.

The depth of the teeth 12 serving for transmission of force is less than the diameter of the sleeves 15. Therefore the sleeves 15 contact the tooth faces transmitting the driving force in a small radial distance from the reinforcement 14 of the belt, and the elastic teeth 12 are subjected to only a small deformation. Besides very little deviations only can occur between the tooth pitch of the toothed belt 11 on one hand and the center distance of the sleeves 15 corresponding to that tooth pitch on the other hand. Furthermore thus the pressure between the sleeves 15 and the reinforcement 14 is kept low.

The spaces between the teeth 12 in circumferential direction are wider than the diameter of sleeves 15, so that the force transmitting tooth faces only bear on the sleeves 15 whilst those tooth faces not transmitting any force do not contact the sleeves 15.

The crests of the teeth 12 are provided with a flattening 18 fitting to an axially parallel bearing surface 19 arranged between the sleeves 15. The bearing surfaces 19 consist of metal or plastic rims provided on their internal side with a stud 20 which is pressed into a corresponding radial bore 21 of the pulley 17. Preferably the bearing surfaces are made from a material of self-lubricating properties.

There is a free interspace 22 between the sleeves 15 and the base of the teeth 12, so that the sleeves 15 only contact those tooth faces which transmit the driving force.

As can be seen from the arrows in FIGURE 2 the radial force $P_1$ is received by the bearing surface 19 between the sleeves 15 of the pin-wheel gear, whilst the tooth faces as well as the sleeves 15 are merely stressed by the peripheral force $P_2$ which is considerably less than the resultant R in FIGURE 1. Thereby the wear occurring on the tooth faces as well as on the sleeves 15 is decreased to a considerable extent, thus imparting a much longer durability to the toothed belt than hitherto.

It should be understood that the invention is not limited to the specific form of execution as illustrated in the drawings and that many modifications may occur within the scope of the invention and the accompanying claims.

My claims are:

1. A toothed belt drive, in combination, a belt consisting of elastic material having regularly spaced teeth on its inner surface, said teeth being formed integral therewith, a pulley in engagement with said belt, said pulley being a pin-wheel gear with pins arranged at equally spaced intervals around the circumference and parallel to the axis of said pulley, a sleeve rotatably mounted on each of said pins drivingly engaged in the spaces between said teeth, and means supporting the crests of said teeth between the sleeves of said pin-wheel gear.

2. Toothed belt drive according to claim 1, characterized in that the crests of the teeth are provided with a flattened surface.

3. Toothed belt drive according to claim 1, characterized in that the means supporting the crests of the teeth consist of a material having a self-lubricating property.

4. Toothed belt drive according to claim 1, wherein the means supporting the crests of the teeth consist of a graphitic plastic material.

5. A toothed belt drive, comprising a belt of elastic yieldable material and having on one surface regularly spaced transverse teeth integral therewith, a pulley in engagement with said belt, said pulley being a pin-wheel gear with pins and a sleeve rotatably mounted on each of said pins and drivingly engaged in the spaces between said teeth, means defining bearing surfaces of said pulley arranged parallel to the axis of revolution of said pulley projecting outwardly from the surface of said pulley between said sleeves supporting the crests of the teeth of said toothed belt when they are in engagement with the pin-wheel gear of said pulley.

6. The toothed belt drive according to claim 5, wherein the depth of said teeth are shorter than the diameter of said sleeves.

7. The toothed belt drive according to claim 5, wherein the spaces between the teeth in peripheral direction are wider than the diameter of the sleeves.

8. Toothed belt drive according to claim 5, wherein said means defining bearing surfaces comprise interchangeable studs.

9. Toothed belt drive according to claim 8, wherein said means defining bearing surfaces comprise ridge-shaped studs provided on their internal side with set-offs inserted into radial bores of the pulley.

10. Toothed belt drive according to claim 5, wherein the sleeves bear on the tooth faces only and are spaced from the tooth base.

References Cited by the Examiner

UNITED STATES PATENTS

| | | | |
|---|---|---|---|
| 487,855 | 12/1892 | O'Connell et al. | 74—231 |
| 1,234,685 | 7/1917 | Nielsen et al. | 74—229 X |
| 3,051,011 | 8/1962 | Zebley | 74—229 X |

DAVID J. WILLIAMOWSKY, *Primary Examiner.*

FRED C. MATTERN, *Examiner.*

J. A. WONG, *Assistant Examiner.*